US010006630B2

(12) United States Patent
Jennissen et al.

(10) Patent No.: US 10,006,630 B2
(45) Date of Patent: Jun. 26, 2018

(54) METHOD FOR FIRING AN INDUSTRIAL FURNACE USING COAL OR COKES WITH A SECONDARY FUEL

(71) Applicant: SUBCOAL INTERNATIONAL B.V., Farmsum (NL)

(72) Inventors: Lars Jennissen, Nieuw Bergen (NL); Ralph Koekkoek, Wageningen (NL)

(73) Assignee: Subcoal International B.V., Nieuw-Bergen (NL)

( * ) Notice: Subject to any disclaimer, the term of this patent is extended or adjusted under 35 U.S.C. 154(b) by 0 days. days.

(21) Appl. No.: 15/129,885

(22) PCT Filed: Apr. 7, 2015

(86) PCT No.: PCT/EP2015/057531
§ 371 (c)(1),
(2) Date: Sep. 28, 2016

(87) PCT Pub. No.: WO2015/155193
PCT Pub. Date: Oct. 15, 2015

(65) Prior Publication Data
US 2017/0130958 A1 May 11, 2017

(30) Foreign Application Priority Data
Apr. 7, 2014 (EP) .................... 14163780

(51) Int. Cl.
| F23G 5/00 | (2006.01) |
| F23G 5/033 | (2006.01) |
| C10L 5/36 | (2006.01) |
| C10L 5/40 | (2006.01) |
| F23G 5/08 | (2006.01) |
| F23G 7/12 | (2006.01) |

(52) U.S. Cl.
CPC ............ *F23G 5/033* (2013.01); *C10L 5/363* (2013.01); *C10L 5/366* (2013.01); *C10L 5/403* (2013.01); *C10L 5/406* (2013.01); *F23G 5/08* (2013.01); *F23G 7/12* (2013.01); *C10L 2250/04* (2013.01); *C10L 2250/06* (2013.01); *C10L 2290/28* (2013.01); *F23G 2201/70* (2013.01)

(58) Field of Classification Search
CPC ... F23G 5/033; F23G 5/08; F23G 7/12; F23G 2201/70; C10L 5/366; C10L 5/363; C10L 5/403; C10L 5/406; C10L 2250/04; C10L 2250/06; C10L 2290/28
See application file for complete search history.

(56) References Cited

U.S. PATENT DOCUMENTS

| 3,961,913 | A | | 6/1976 | Brenneman et al. |
| 4,008,053 | A | | 2/1977 | Brenneman et al. |
| 4,529,407 | A | * | 7/1985 | Johnston ................ C10L 5/14 |
| | | | | 44/542 |
| 4,748,919 | A | | 6/1988 | Campobenedetto et al. |
| 5,342,418 | A | | 8/1994 | Jesse |
| 5,643,342 | A | * | 7/1997 | Andrews ................. C10L 5/40 |
| | | | | 44/530 |
| 6,635,093 | B1 | | 10/2003 | Schoen et al. |
| 2010/0101107 | A1 | * | 4/2010 | Kowoll .................... C10L 5/04 |
| | | | | 34/368 |

FOREIGN PATENT DOCUMENTS

| EP | 0430376 A2 | 6/1991 |
| EP | 1083212 A1 | 3/2001 |
| EP | 2307531 B1 | 2/2012 |
| JP | 2000256504 A | 9/2000 |
| WO | 2008/106993 A1 | 9/2008 |
| WO | 2008/107042 A2 | 9/2008 |
| WO | 2010/012510 A1 | 2/2010 |

OTHER PUBLICATIONS

European Search Report for priority application EP14163780.1 dated Sep. 19, 2014.
International Search Report for PCT/EP2015/057531 dated May 15, 2015.
International Preliminary Report on Patentability for PCT/EP2015/057531 dated Oct. 12, 2016.
Co-firing wood pellets with coal; World-Generation Jun./Jul. 2011, vol. 23 No. 3.
Bill Livingston, "Direct injection advances biomass co-firing in large coal fired plants", Power Engineering International, Jul. 1, 2008.

(Continued)

*Primary Examiner* — Cephia D Toomer
(74) *Attorney, Agent, or Firm* — Ramin Amirsehhi; David P. Owen

(57) ABSTRACT

The invention relates to a process for firing an industrial furnace, in particular for electricity generation, wherein coal or cokes together with a secondary fuel comprising cellulose and plastic, in the form of pellets of a size larger than about 3 mm thickness, and having a caloric value of about 16 GJ/ton or more is ground to a powder wherein about 95 wt % or more has a particle size smaller than 2 mm and wherein the d50 of the particle size distribution is between about 5 and about 100 µm, wherein the powder is injected in the flame of the furnace. In this process the grinding is performed in a roller mill or ball mill, and the amount of pellets used together with the coals preferably is about 3 wt % or more, relative to the coal.

20 Claims, No Drawings

(56) References Cited

OTHER PUBLICATIONS

Anonymous, "Pulverized coal-fired boiler", Wikipedia, the free encyclopedia, Mar. 3, 2014, retrieved on May 4, 2015: URL: http://en.wikipedia.org/w/index.php?title=Pulverized_coal-fired_boiler&oldid=598003290.
European Recovered Fuel Organisation, "SRF: achieving environmental and energy-related goals markets", Powerpoint Presentation, Jun. 2006.
Hein, K.R.G. et al, "EU clean coal technology—co-combustion of coal and biomass", Fuel Processing Technology 54 (1998), p. 159-169.
Kakaras, E. et al, "Solid recovered fuel as coal substitute in the electricity generation sector", Thermal Science, vol. 9 (2005), No. 2, p. 17-30.
Kipshagen, F-J. et al, "SRF Co-combustion at RWE", RWE Power, Recofuel Workshop, May 29, 2008.
Livingston, W.R., "The firing and co-firing of biomass in large pulverized coal boilers", IEA Exco Workshop Jeju, Nov. 2013.
Ohlsson, O. et al, "Results of combustion and emissions testing when co-firing blends of binder-enhanced densified refuse-derived fuel (b-dRDF) pellets and coal in a 440 MWe cyclone fired combustor, vol. 1: Test methodology and Results", Jul. 1994.
Ohlsson, O. et al, "Producing usable fuel from municipal solid waste", New Technology for America's Electric Power Industry, presented at the Power Generation Conference, Orlando, FL, Dec. 7-9, 1994.
Ohlsson, O. et al, "Development of refuse derived fuel (RDF) pellets and implications for the lime industry".
Paoli, P. et al, "Micropollutants production in RDF-coal co-combustion in the Fusina-Venice power plant", Organohalogen Compounds vol. 69 (2007), p. 952-955.
Pedersen, A.J. et al, "Formation and characteristics of combustion aerosols from co-firing of coal and solid recovered fuel in a 400 MW PF-fired coal boiler", 2010, Power production and environment.
Wu, H. et al, "Co-combustion of coal and SRF in an entrained flow reactor: a preliminary study", 4th European Combustion Meeting. Technical University of Denmark, Department of Chemical Engineering, 2009.
Wu, H. et al, "Co-combustion of pulverized coal and solid recovered fuel in an entrained flow reactor—General combustion and ash behaviour", Fuel 90 (2011), p. 1980-1991.

\* cited by examiner

METHOD FOR FIRING AN INDUSTRIAL FURNACE USING COAL OR COKES WITH A SECONDARY FUEL

CROSS REFERENCE TO RELATED APPLICATIONS

This application is a U.S. National Stage under 35 USC 371 of PCT application number PCT/EP2015/057531 filed on 7 Apr. 2015, which claims priority from EP application number 14163780.1 filed on 7 Apr. 2014. Both applications are hereby incorporated by reference in their entireties.

The present invention concerns a method for firing an industrial furnace using powdered coal or cokes together with a secondary fuel.

BACKGROUND OF THE INVENTION

Industrial furnaces using powdered coal or cokes are used, e.g. in thermal power stations or thermal power plants for electricity and/or heat generation. Furnaces using powdered coal or cokes are also used for cement kilns. The use of coal is more common than that of cokes in furnaces for power plants; cokes are more often used in blast furnaces and either one is commonly used in cement kilns.

A thermal power station is a power plant in which the prime mover is steam driven. Water is heated, turns into steam and spins a steam turbine which drives an electrical generator. After it passes through the turbine, the steam is condensed in a condenser and recycled to where it was heated. The greatest variation in the design of thermal power stations is due to the different fossil fuel resources generally used to heat the water. Certain thermal power plants also are designed to produce heat energy for industrial purposes of district heating, desalination of water, cement kilns or the like, sometimes in addition to generating electrical power.

Many thermal stations use coal as the main fuel. Raw coal is transported from coal mines to a power station site by trucks, barges, bulk cargo ships or railway cars. The coal received at site may be of different sizes. The coal can be used as such, or can be conveyed to crushers which crush the coal to about ¾ inch (19 mm) size up to about 1.2 inch (30 mm) or the like. The raw feed coal from the coal storage area is optionally crushed, and conveyed to the coal feed hoppers to the mills (pulverisers) at the boilers.

The coal is next pulverized into a very fine powder. The pulverizers may be roller mills (rotating drums grinders, or bowl mills), ball mills, or other types of grinders. Grinding and milling are generally used as synonyms, and these words are used in the present specification as synonyms as well.

Generally, bituminous coal is used, but the furnace can also be fired with powdered cokes or other qualities of coal. Bituminous coal is softer than cokes.

Globally, fossil fuelled thermal power plants produce a large part of man-made CO2 emissions to the atmosphere, and efforts to reduce these are varied and widespread.

One of the efforts comprise using organic material such as wood saw dust, or wood pellets, sewage sludge pellets and the like as fuel in power plants and kilns. However, such co-firing is substantially limited by a number of factors. A relatively recent publication (Co-firing wood pellets with coal; in World-Generation June/July 2011, Vol 23 number 3) explains that co-firing can be done in a number of ways: (i) indirect co-firing; this means that the additional fuel is prepared and burned separately, and the heat is combined with the heat of the primary source. Obviously, this is a costly method, as a complete additional furnace has to be build. (ii) direct co-firing with separate injection; this means, that the fuel is prepared for burning, e.g. by separate milling, and that the fuel is added to the flame with a separate lance. This requires additional lay-out and investments, yet, this is (often) economically feasible; (iii) direct co-firing without separate injection; In this case, the additional fuel is mixed with the optionally crushed (but not yet powdered) coal, and the fuel stream is directed to the milling station to prepare the powder for the furnace. This last mentioned method is considered a preferred method in view of costs. However, it is generally accepted that this method cannot be used with most secondary fuels, or, for example for saw-dust, for a maximum of a few percent only. Problems generally are considered to reside in the milling operation and/or the burning, yielding not sufficient energy by the secondary fuel.

Comparable information can be found in an article by B. Livingstone "Direct injection advances biomass co-firing in large coal fired plants"; PEI (Power Engineering International), 1 Jul. 2008 (XP055139025). The main focus of this article is the direct injection of ground biomass, in which the biomass is ground in a milling operation separate from the coal milling operation. Further, the amounts suggested to be suitably used seems to be substantially overestimated.

Further, it is known to co-fire plastic containing waste as fluff. This requires substantial investment to handle the fluff, and lowers the efficiency of the burner, as particles are so large, that the burn-out time increases.

In JP 2000/256504, it is suggested to use waste plastic as additional source for grinding with coal. No pellets are described, and therefore the waste stream will consists of irregular forms, much like fluff. The use of fluff severely hampers the transportation of the waste material. Furthermore, the co-grinding of coal with plastic material is performed at room temperature in a hammer mill. Thus, although co-grinding is described, this co-grinding is not under the process conditions of grinding of coal as normally done in power plants. In processes wherein coal is ground, heated gas (usually air) is used, which gas is also used to blow (or transport) ground particles to the furnace. This gas is generally heated till at least about 200° C. or higher (inlet temperature), while the outlet temperature generally is about 70° C. or higher. At such high temperature, it can be expected that the plastic will melt, causing processing problems.

U.S. Pat. No. 6,635,093, WO2008/107042 and WO2010/012510 describe pellets suitable for use in powdered coal fuelled furnaces. To achieve a suitable burn-out time, it is important that the pellets are ground to particles predominantly smaller than 2 mm. Milling is performed in a separate grinder, and an air turbulence mill is indicated. The ground particles are preferably blown into the flame directly. Other references refer to a hammer mill, or a pin mill for grinding pellets. All these mills are high maintenance, and/or (relatively) low in throughput.

SUMMARY OF THE INVENTION

It is an object of the invention to provide for a process for firing an industrial furnace using powdered coal together with a secondary fuel, wherein the secondary fuel is used as direct co-firing fuel, without separate milling or injection.

This object is achieved by providing a process for firing an industrial furnace wherein coal or cokes together with a secondary fuel comprising cellulose and plastic, in the form of pellets of a size larger than about 3 mm thickness, and having a caloric value of about 16 GJ/ton or more, is co-ground to a powder with a particle size wherein about 95 wt % or more of the powder has a particle size smaller than 2 mm and wherein the d50 of the particle size distribution is between about 5 and about 100 μm, wherein the powder is injected in the flame of the furnace.

The invention furthermore provides for the use of said secondary fuel as direct co-firing fuel, without separate injection, in furnaces using powdered coal or cokes as primary fuel.

Preferably, about 3 wt % or more is used of the pellets, relative to the coal or cokes. More preferably, about 5 wt % or more is used, like for example, about 5 wt %, about 7 wt %, about 10 wt %, or about 15 wt %. Generally, the amount will be about 30 wt % or less, and about 20 wt % or less may be preferred for easy processing.

The milling preferably takes place in a roller mill (also named bowl mill or rotating drum grinder) or ball mill, as these mills are low in maintenance and have a high throughput. Hammer mills, air turbulence mills (ultra-rotor) or pin mills are high in maintenance, and/or low in throughput, and not delivering small size pellet particles together with small size coal particles when pellets and coal are grinded together in such mills. In view of these problems, hammer mills, air turbulence mills (ultra-rotor) or pin mills are preferably not used.

It was unexpected that plastic containing pellets, and pellets containing even relatively large amounts of plastic could be co-grinded in a milling operation, as this milling operation is carried out at a temperature above the melting temperature of the plastic film present in the pellets (mainly polyethylene). Experiments showed that no fouling was observed of the walls or the drums of a roller mill, even when operated at temperatures as are usual in the grinding operation in for instance power plants.

An advantage of the use of the pellets with substantial amount of plastic is that the caloric value can be substantially higher than that of (even dry) wood pellets. Hence, the efficiency of the burners does not have to be compromised, or at least less compromised, than with the use of wood pellets. Further, these pellets can be relatively dense and hard, meaning that these can be easily and effectively transported.

The results were furthermore unexpected as coal milling equipment is typically designed to mill relatively hard, brittle materials. The fuel pellets, due to the presence of plastics, are much tougher than coal or cokes and are therefore typically grinded in different mills, such as for example according to EP2307531B1 in air turbulence mills (ultrarotor). The present invention however shows that it is possible to grind such tough, more elastic pellets by co-grinding these with coal and/or cokes in equipment normally used to grind 100% of coal and/or cokes, more in particular in a roller mill or ball mill.

DETAILED DESCRIPTION OF THE INVENTION

The invention relates to a process for firing an industrial furnace wherein coal or cokes together with a secondary fuel comprising cellulose and plastic, in the form of pellets of a size larger than about 3 mm thickness, and having a caloric value of about 16 GJ/ton or more, is co-grinded to a powder with a particle size wherein about 95 wt % or more of the powder has a particle size smaller than 2 mm and wherein the d50 of the particle size distribution is between about 5 and about 100 μm, wherein the powder is injected in the flame of the furnace.

In the process according to the invention, the coals (or cokes) and the pellets are mixed before entering the grinder, or are both fed to the grinder in the proportions required. Hence, the outlet of the grinder contains small—ground—particles of both the coal (or cokes) and the pellets. The stream of small particles is blown into the fire of the furnace.

The grinders, or mills, may be roller mills, ball mills, or other types of grinders. In Europe, roller mills are most common; these grinders are also called bowl mills, rotating drum grinders or vertical roller mills. Ball mills are different from bowl mills, as in ball mills the grinding is caused by freely moving spherical objects, while in bowl mills, the grinding is caused by wheels or cylindrical/conical objects, which are in a fixed position (apart from possibly some lateral movements and the like) relative to the outer surface of the mill. Hereinafter, the expression roller mill and bowl mill may be used interchangeably.

In one embodiment, the process of the invention comprises the use of a roller mill.

In another embodiment, the process of the invention comprises the use of a ball mill.

Generally, bituminous coal is used, but the furnace can also be fired with powdered cokes or other qualities of coal and cokes. The use of bituminous coal is preferred.

The grinder may be operated with a heated gas, in order to dry the powdered coal (which may have up to 10-12 wt % moisture relative to the dry material). Also, the heated gas pre-heats the coal, making the heat release during burning more efficient. This flow of gas, usually air, is also used for transporting the powder (the powder resulting from grinding coal, and in the present invention also from ground pellets) into the furnace. The gas upon entrance generally has a temperature in excess of 200° C. The grinder thereby operates at elevated temperature, also because of the heat dissipation caused by the grinding itself. The temperature in the mill can easily reach 120° C. or more, and it was expected that co-grinding of plastic containing pellets would result in fouling of the surfaces of the grinder because polyethylene melts at around 100-120° C. However, no fouling was observed in the tests as described in this patent application.

Thus, in a preferred embodiment, the grinder is operated with a flow gas, wherein the flow gas is at a temperature of about 164° C. or higher upon entrance of the mill.

This flow gas is used to blow the ground particles of both the coal and the secondary fuel into the furnace.

The process of the invention preferably is performed with a flow gas to transport the powder, which flow gas upon entrance of the mill has a temperature in excess of 200° C. Generally, the temperature of the flow gas at the inlet of the mill will be about 300° C. or lower, preferably about 250° C. or lower.

The output temperature of the material leaving the grinder generally will be about 60° C. or higher, and preferably is about 70° C. or higher. The output temperature generally will be about 130° C. or lower, preferably about 110° C. or lower.

The output temperature of the material leaving the grinder preferably will be about 77° C. to about 90° C.

The amount of pellets to be used together with the coal or cokes can be varied over a large range. Obviously, when more pellets are used, the $CO_2$ emission from coal or cokes is reduced, because more recycled material is burned.

Preferably, about 3 wt % or more is used of the pellets, relative to the coal or cokes. More preferably, about 5 wt % or more is used, like for example, about 5 wt %, about 7 wt %, about 10 wt %, or about 15 wt % or the like. However, less than 3 wt % still allows CO2 neutral additional fuel to be used, and such low amounts are therefore not excluded. Generally, the maximum amount of secondary fuel is not limited, unless for technical reasons, that for example the milling apparatus does not achieve good particle sizes, that the milling equipment experiences build-up of material in the grinder, and/or that fouling starts to build up in the milling equipment. Hence, generally, it is expected that about 30 wt % or less of secondary fuel will be used, for example about 20 wt % or less.

The particle size—after milling—will be largely dependent on the requirements of the burner. Large particles, like up to 5 mm will be hardly present, but the presence of a small amount of such particles may not harm. Preferably, no or about 1 wt % or less of particles of 5 mm or larger are present. Preferably about 2 wt % or less of particles of about 3 mm or larger are present in the powdered fuel. The amount of particles larger than 2 mm is generally about 5 wt % or less, preferably about 3 wt % or less, more preferably about 2 wt % or less, and most preferred about 1 wt % or less.

These larger particle sizes (i.e. size larger than 2 mm) are measured on particles that have such large size in two dimensions. The larger particles generally are plastic foil particles, and the thickness of these particles is generally at most 200 µm. Hence, preferably, about 95% or more of the particles that have a size over 2 mm in a sieve experiment, have a size in one dimension of about 500 µm or less, preferably about 200 µm or less.

Preferably, the amount of particles—after milling—larger than 90 µm is about 50% or less, preferably about 30 wt % or less. Generally, the amount of particles larger than 90 µm is about 5 wt % or more, preferably about 10 wt % or more. This amount preferably is measured with screening over physical screens.

Preferably, the d90—after milling—is about 0.5 mm or lower, more preferably about 0.3 mm or lower, and most preferably 0.2 mm or lower.

Preferably, the d50—after milling—is 50 µm or lower, more preferable, about 40 µm or lower. Preferably, the d50 is about 10 µm or higher.

The d90 and d50 can be calculated from a particle size distribution measured by sieving analysis with standard sieves of 63, 90, 200, 315, 630, 1000, 2000, 3150 and 5000 µm. A d50 smaller than 60 µm is an extrapolation; generally, the amount of particles in the sieves show a largely linear relation with the size, when the size is plotted on a log scale. It is also possible to measure the particle size distribution with a laser particle size counter.

The above described preferred particle sizes are characteristic for well ground coal, irrespective of the presence of pellets.

The pellets used in the present invention comprise cellulose and plastic and generally have a size of about 3 mm thickness or larger, generally have a caloric value of about 16 GJ/ton or more, and preferably have a percentage moisture relative to dry pellets of about 15 w % or less and preferably have an ash content of about 20 wt % or less.

Preferably, the bulk density (tapped) of the pellets is about 350 kg/m$^3$ or higher, preferably about 400 kg/m$^3$, such as for example about 430 or 450 kg/m$^3$. Generally, the density is about 600 kg/m$^3$ or lower, for example about 550 kg/m$^3$ or lower. It may be noted that fluff (non-pelleted waste, suitably for burning) generally has a density between 150 and 200 kg/m$^3$ and sometimes somewhat higher, but to the best of the knowledge of the inventors never higher than 300 kg/m$^3$.

Preferably, the strength of the pellets is about 5 kgf or more, preferably about 8 kgf or more, more preferably about 10 kgf or more. Generally, the strength is about 40 kgf or less, often about 25 kgf or less. It is however possible to have even harder pellets, for example having a strength of up to 70 kgf or less, for example 60 kgf or less. It may be preferably to have a strength of about 30 kgf or less. The hardness can be measured with a Kahl pellet hardness tester, available from Amandus Kahl GmbH&Co KG, Hamburg. A sufficient strength has the advantage that the pellets have a relatively high density, which allows efficient transport, and the strength precludes the formation of large amounts of fines during the transport. The Kahl pellet hardness tester is one of the standard test methods in the industry.

The caloric value of the pellets is preferably about 18 GJ/ton or more, 20 GJ/ton or more, and can be for example 21 GJ/ton, 22 GJ/ton or about 23 GJ/ton. The caloric value generally is about 25 GJ/ton or less. The caloric value is a.o. dependent on the amount of plastic material in the pellet, and a higher caloric content reflects a higher plastic content. The caloric value will be lowered by the amount of ash.

The moisture content of the pellets relative to dry pellets is about 15 wt % or less, preferably about 10 wt % or less, and most preferable about 7 wt % or less. Generally, the moisture content will be about 1 wt % or more, and often about 2 wt % or more The ash content of the pellets generally is about 20 wt % or less, preferably about 18 wt % or less, more preferable about 15 wt % or less, and most preferable about 13 wt % or less. Generally, the ash content will be about 4 wt % or more, and often about 6 wt % or more, but a lower ash content is preferred.

The pellets can be prepared from waste mixtures. Cellulose/plastic waste mixtures originate for example from industrial, domestic, urban or municipal waste. This stream often comprises a relatively high percentage inert material, in particular sand. Also, there exists waste from a paper recycling process. In the latter case the waste mixture, the so-called reject stream, is obtained after pulping and separating out the paper pulp in the paper recycling process, and still comprises, in addition to plastic, paper waste.

The mixture of cellulose/plastic waste particles for use in the present method may be any waste mixture comprising cellulose- and thermoplastic materials. Preferably, cellulose and thermoplastic materials constitute an important part of the components of the waste mixture, and preferably they constitute in total at least 30 weight % of the waste mixture, more preferably at least 40 weight %, and most preferably at least 50 weight %, based on the total amount of solid components. However, pre-treated waste streams may be used comprising about 70 weight % or more, or even about 80 weight % of cellulose/plastic waste material.

In general, the cellulose/plastic waste mixture originates from domestic waste (including municipal and urban waste) and/or industrial waste streams. The cellulose material may originate from for example paper, cardboard, cardboard cups, wood, diapers, bandages, and textile, such as cotton, viscose and rayon. The cellulose material may comprise organic material, such as bread, meat and vegetable waste etc., which are in fact treated as cellulose fibre.

The thermoplastic material may originate from for example packaging material such as polymeric foil material. In principle all types of thermoplastic polymers may be present in the cellulose/plastic mixture. Examples of thermoplastic polymers which are in general present, are (substituted) polyolefins; polystyrene; polyesters, such as polyethene terephthalate (PET); polyamides, and copolymers and mixtures thereof. The thermoplastic material may also include halogenated polymers such as poly(vinylchloride) (PVC), although this is not preferred. In a preferred embodiment, most of the chlorine-containing polymer material is removed.

The thermoplastic material in the cellulose/plastic waste mixture is generally mainly based on polyethene homo and/or copolymers. Usually, the thermoplastic material comprises for at least 60 weight %, preferably at least 70 weight %, more preferably at least 75 weight % and most preferably at least 80 weight % of polyethene homo and/or copolymers.

An industrial waste stream which can be applied for obtaining a cellulose/plastic waste mixture for making suitable pellets, is the paper reject stream which is obtained after separating out the majority of the paper pulp in the paper recycling process. As with municipal waste streams, this waste stream contains plastic foils, metal, and other undesirable materials.

Usually, the mixture of cellulose/plastic waste particles for use with the present method comprises 10 to 85 weight % of thermoplastic material and 15 to 90 weight % of cellulose material, each based on the total dry weight of the cellulose and thermoplastic materials. The actual composition boundaries of the mixture depend on the initial moisture content of the mixture and the desired moisture content of the mixture when it leaves the dryer.

In a first preferred embodiment of the invention, a waste stream is used which is obtained from municipal waste (MSW, municipal solid waste). Such a stream contains in general 15-30% of moisture, and usually 20-25% of moisture. Furthermore, this stream contains relatively much inert material, usually about 15 weight % or more, and often 15-20 weight %. Also, this stream may contain some organic material which may be considered equivalent to cellulose fibre for the purpose of this invention. Preferably, the organic component of the waste material (exclusively waste based on cellulose, such as paper and cardboard) amounts to less than 30 weight %, preferably less than 20 weight %, and more preferably less than 10 weight %.

In a second preferred embodiment of the invention a waste stream is used which is obtained from paper recycling waste. Such a stream contains in general 30-65 weight % of moisture, and usually 40-60 weight % of moisture. Additionally, this stream contains a relatively high amount of chlorine-containing material, usually about 1 weight % or more, and usually 1-2 weight %, but sometimes even 2.5 weight % or more. The amount of inert material is generally less than in MSW, and is in general less than 15 weight %, and usually less than 10 weight % (on dry matter basis).

It may be useful to mix waste streams, and for example to add paper rejects to the MSW waste, add a plastic fraction to paper reject or the like.

Cellulose/plastic waste mixtures may be processed into fuel pellets. In order to obtain a combustible material, the treatment of the cellulose/plastic waste mixture comprises several purification steps. With the waste streams from the paper processing—containing a lot of water—part of the water is removed from the cellulose/plastic waste mixture by pressure.

For most sources of waste, generally, moisture is removed by thermal drying. Although, drying is not necessary if a waste stream is used that is sufficiently dry.

Apart from cellulose and thermoplastic materials, the mixture of cellulose/plastic waste particles for use in the present method comprises also other materials, such as metals, stones, for example sand, ceramic material or glass. It is preferred to remove these contaminants as much as feasible because they may impede the further processing of the cellulose/plastic waste mixture, for example a pelletizing step and to obtain a useful fuel. Since these materials cannot burn (hereafter also called not-combustible materials), they decrease the caloric value of the fuel and increase the ash content. The cellulose/plastic waste mixture may also contain thermo hardening materials (resins), which are usually combustible and therefore do not need to be removed. Yet, these resinous materials are generally difficult to pelletize, and larger parts are therefore also preferably removed and/or ground to small particles, of for example sizes of less than 10 mm.

Generally, at least heavy, large and/or non-combustible material is removed, such as large stones, concrete, pieces of metal and the like. For that purpose sieving may be appropriate, but also manual sorting on a sorting belt or a process in which the light (paper-plastic) fraction is sorted from other materials by means of air classification. With paper reject waste streams this step is in general not necessary. Furthermore, from waste treatment companies (e.g. from material recovery or sorting facilities) waste streams are available that lack such heavy material. Preferably, the large ferro and non-ferro metal parts may be removed at this stage with a magnet and an Eddy-current system.

In a further pre-processing step the waste is treated in a shredder to obtain particle material of a certain size, such as for example all parts smaller than 200 mm, preferably about 150 mm or less, such as, for example about 100 mm, about 120 mm or about 80 mm. In general, the size is given as a length, which implies that 95 weight % of the material has a maximum size in one dimension of the given length. It is possible to cut the material in still smaller pieces (for example less than 50 mm), but this is not preferred because of the presence of solid material residues, such as glass, stone, etc., which lead to excess wear and which may damage the shredder. In this stage of the method, the cutting occurs in general into pieces of about 60 mm or more, preferably about 80 mm or more. Of course, the waste stream will always still contain smaller parts, but these are not necessarily cut up in the shredder.

The removal of chlorine-containing foil parts generally is performed in a separate step. Such separation step preferably comprises an optical sorting of chlorine containing foil or parts. For example a NIR analysis-apparatus locates chlorine comprising components on a belt, after which an automatic removal device specifically takes out the plastic parts. The removal device can be pressurized air, blowing the pieces of plastic from the belt, or a picking device. Additionally, for an efficient separation, preferably the size of the foil parts is about 60 mm or more. Usually, the size will be smaller than 25 cm, preferably about 15 cm or less. Many smaller parts, such as smaller than 30 mm may also be purified, however, it is more difficult to achieve an efficient purification.

Generally, the waste stream is dried, for example on a belt dryer, or in a trommel drier, to a suitable percentage moisture, that allows to prepare pellets with the required amount of moisture. Generally, the waste stream is dried to a moisture percentage (on dry weight) of 5-20 wt %. Pelletizing can be done in a way that leads to pellets with less than 15 wt % moisture, preferably less than 10 wt % moisture.

After drying, wind sieving, removal of small metal parts, further removal of chlorine containing plastic and the like can be done as fit.

In a particulate embodiment, the pellets can be made from cellulose/plastic mixtures wherein the content of thermoplastic material is at least 40 weight %. In this embodiment high-caloric fuel may be obtained from the cellulose/plastic waste mixture. It may be desirable, prior to making pellets, to add some thermoplastic material, usually chlorine-free, to increase the caloric value of the fuel obtained from the cellulose/plastic waste mixture, and/or to lower the chlorine content of the cellulose/plastic waste mixture.

In a further embodiment, the pellets contain sufficient plastic material, which is sufficiently molten during the pelletizing step, that the pellets are hydrophobic (i.e. repel water). This has the advantage that the pellets can just be stored outside, without shelter, like for example in the same bunkers as the coal or cokes. Generally, the pellets are sufficiently hydrophobic when they contain about 40 wt % of plastic, preferably about 50 wt % of plastic.

In still another embodiment the pellets can be made from a cellulose/plastic waste mixture wherein the cellulose represents 20 to 70 weight % and the thermoplastic material represents 70 to 20 weight %. There is a specific need for an efficient treatment of such a mixed waste stream because it is difficult to separate out cellulose or plastic in an efficient manner.

Further processing of the mixture of cellulose/plastic particles comprises among others compacting prior to storage. The latter compacting method is preferably carried out in a pelletizing device, which produces pellets with a diameter of preferably about 20 mm or less, more preferably about 16 mm or less, such as for example 6, 8 or 12 mm. Generally, the size of the pellets will be about 3 mm or more. A method which is well applicable, is described in EP-A-1 083 212 as well as in U.S. Pat. No. 5,342,418. Other references with suitable pelletizing processes include WO2008/106993 and EP-B-2307531.

The pellets can easily be stored and transported to another location for further use.

In another embodiment, compacting into pellets with a diameter (thickness) of about 25 mm or less is performed in the form of soft pellets. Such pellets can still be well transported and may also be used, for example, in cement kilns without grinding.

As explained in the background of the invention, industrial furnaces are used in thermal power plants for electricity generation. This type of industrial furnace is particularly demanding with respect to burn-out time. The process of the invention is particularly suitable in a process for firing an industrial furnace for electricity generation.

The invention further relates to the use of pellets comprising cellulose and plastic, having a size larger than about 3 mm thickness, and having a caloric value of about 16 GJ/ton or larger, as secondary fuel in industrial furnaces using powdered coal as primary fuel wherein the pellets are used as direct co-firing fuel, without separate injection, for grinding together with the coal.

The industrial furnace is preferably a furnace for electricity generation. This use of the pellets preferably is done with pellets of which the preferences are described above, in a process with the preferences as described above. A skilled person will understand that all these preferences can be combined.

The invention is further described by means of the following examples, which cannot be taken as a restriction of the invention.

EXPERIMENTS A-C AND EXAMPLES 1-5

Co-milling experiments were performed with bituminous coal (US steam coal 0×50 mm, hence coal comprising fines and coal up to 5 cm) and pellets made according to EP-A-1 083 212.

Coal particles larger than 30 mm were screened before the grinding experiments because the laboratory grinder cannot handle larger sizes than 30 mm. Yet, the feed as used in these examples is comparable to the feed to the mills in power plants. The coal as used contained 11.3 wt % moisture, 11.2% ash, and 26 GJ/ton gross caloric value.

The pellets contained 3.0-3.3% moisture and 11.8 wt % ash (on dry pellets). The amounts of plastic and cellulose in the pellets were 25 wt % or more and 35 wt % or more respectively. The assessment of organic material was not so easy, and the figure is the lower value, as more plastic or cellulose material may be present. The amount of polyethene in the plastics fraction was about 70%. The caloric value was 21 GJ/ton. Pellet sizes of 8 and 12 mm diameter were used. The hardness of seven 8 mm pellets was tested, and of four 12 mm pellets. The readings (Khal) for the individual pellets was between 16 and 21 kgf for the 8 mm pellets, and between 13 and 21 kgf for the 13 mm pellets.

A Technical Laboratory bowl mill SM04/2 was used. First, the bowl mill was calibrated with a bituminous coal load of 400 kg/h, to have a $R_{90}$, (i.e. the particles larger than 90 μm) of about 15 wt %, which is a state analogous to power plant conditions. In a number of experiments, pellets were added to the coal after weighing both materials, prior to a rotary feeder to ensure correct concentrations in the mill.

The grinder was set to bowl revolution of 127 rpm with a motor revolution of 800 rpm, 50 bar grinding pressure and 20 bar back pressure, respectively. The effective force was 11.4 KN. The rotary classifier was equipped with 8 wings (24 wings possible) and was turning with 134 rpm with coal, but was not rotating in the experiments. The damring height was 20 mm. Classifier temperature was set to 86° C. Gas flow of 1043 m$^3$ transported 0.4 kg fuel per m$^3$ of gas. The temperature of the gas at the inlet was 217° C., and the outlet 89° C. This led to smooth running of the mill for bituminous coal grinding. Constant parameters were recorded within short time. For optimum conditions, the process was tuned marginally by varying gas flow (about 5%). Power consumption of 1.7 kW (specific power consumption 4.3 kWh/t) and almost no distance between bowl and hydraulic cylinder indicated a grinding process with ease.

As a reference, the mill was calibrated again with only bituminous coal (400 kg/h, setup 1) under conditions (gas flow 1051 m$^3$/h, 89° C. classifier temperature, 5.8 kWh/t). The bowl mill ran smoothly (amplitude of power consumption around 1 to 5 kW) and without any turbulences. When steady state was indicated by constant process parameters, sampling yielded black dust characterised by a particle size distribution of 19.9% larger than 90 μm (the $R_{90}$ value), and 1.7% of moisture and between 1 mm (0.03% residue) and 63 μm (66.5% passing). Microscopic analysis of the product shows spherical coal fragments and confirms these results qualitatively.

In the first co-milling setting (Example 1) 5% of pellets with a diameter of 8 mm were mixed with bituminous coal and added to the mill. Heightening of mill's sound and vibrations were first evidence for grinding process. Compared to calibration state running was not as smooth as before but acceptable. Process parameters show equilibrium state even though intensity of signals was amplified and some parameter changed. Especially power consumption and even more specific power consumption prove successful milling (average 3.5 kW, 8.8 kWh/t, intermittent above 10 kW). Based on the $R_{90}$-value (22.8%) grain size distribution of sample 3 was increased to little extend (max. corn 3.15 mm, 0.11%). Moisture of the product is in the same range as in the reference sample. Microscopy reveals certain share of filaments within the spherical coal particles. Dimension of the fibers is approximately 1 to 2 mm (length) and 0.01 millimeter (diameter).

With increasing amount of pellets (Examples 2 and 3) amplitudes and periodicity of the process parameters (power consumption, way, gas flow pressure) was changed slightly toward lower values. Since higher input of pellets causes a voluminous intermediate inside the mill pressure difference is heightened within an acceptable and manageable range. As a result, the samples show almost no tendency towards coarse grain (22.6% and 27.7% $R_{90}$, gas flow: about 1020 $m^3/h$), maximum corn is changed to 5 mm (0.3% and 0.2%) and drying behaviour is almost the same (1.7% moisture).

For the next trial series of experiment, the mill was gas-purged and calibrated with 100% bituminous coal. In Example 4, a mixture of 95% coal and 5% 12 mm pellets was inserted in the process. Since a 4 mm grist layer was formed between bowl and hydraulic cylinders and power consumption as well as specific power consumption were lowered (2.6 kW and 6.5 kWh/t) compared to Example 1 (3.5 kW and 8.8 kWh/t) co-milling seems to be more effective and efficient in this case. Geometries and positions of the graphs within the grid are almost identical (max. corn size higher: 5 mm, 0.03% residue) and proof for the same result (21.6% R90, 1057 $m^3/h$ gas flow). The result of the microscopic investigation is the same for this sample than for the other samples originating from co-milling processes: Fibrous filaments are dispersed within spherical particles. Finally, in Example 5, share of pellets was increased to 10% load. While power parameters show same quantity (2.8 kW, 7.0 kWh/t) and quality. Coarse grain is found via sieving analysis (34.9% R90, 1022 $m^3/h$ gas flow). This confirms the observations made for Example 3 where the same effect was found.

Results are summarized in the next two tables:

| Experimental data | Experiment A | Example 1 | Example 2 | Example 3 |
|---|---|---|---|---|
| Feed coal/pellets wt/wt | 398 | 378/22 | 366/34 | 359/41 |
| Size pellets | | 8 mm | 8 mm | 8 mm |
| Temp at mill inlet (° C.) | 217 | 196 | 194 | 198 |
| Temp after classifier (° C.) | 89 | 90 | 85 | 85 |
| Pressure at mill inlet (mbar) | −0.4 | −1.0 | −0.7 | −0.5 |
| Pressure after classifier (mbar) | −15 | −17 | −19 | −20 |
| Gasflow after cyclone ($m^3/h$) | 1051 | 1067 | 1028 | 1015 |
| Specific power consumption (kWh/t) | 5.8 | 8.8 | 8.3 | 7.3 |
| Grinding 200/90 μm sieve (wt %) | 4.1/19.9 | 5.2/22.8 | 6.3/22.6 | 9.2/27.7 |
| Grinding d50 (μm) | 28.4 | 13.9 | 8.9 | 15.8 |
| Grinding 2 mm/5 mm sieve (wt) | 0/0 | 0.4/0 | 0.9/0.3 | 1.9/0.2 |
| Moisture content (%) | 1.69 | 1.70 | 1.72 | 1.67 |
| Fuel load ($kg/m^3$) | 0.38 | 0.37 | 0.39 | 0.39 |

| Experimental data | Experiment B | Example 4 | Example 5 | Exper. C |
|---|---|---|---|---|
| Feed, coal/pellets wt/wt | 398 | 378/22 | 359/41 | Coal: 398 |
| Size pellets | | 12 mm | 12 mm | |
| Temp at mill inlet (° C.) | 211 | 164 | 170 | 220 |
| Temp after classifier (° C.) | 86 | 84 | 77 | 79 |
| Pressure at mill inlet (mbar) | −0.8 | −1.7 | −1.7 | −0.7 |
| Pressure after classifier (mbar) | −17 | −19 | −20 | −16 |
| Gasflow after cyclone ($m^3/h$) | 1043 | 1057 | 1022 | 1000 |
| Specific power consumption (kWh/t) | 4.3 | 6.5 | 7.0 | 4.0 |
| Grinding 200/90 μm sieve (wt %) | 1.4/14.2 | 5.9/21.6 | 14.0/34.9 | 5.2/30.5 |
| Grinding d50 (μm) | 19.0 | 15.8 | 31.3 | 21.5 |
| Grinding 2 mm/5 mm sieve (wt %) | 0/0 | 0.4/0.03 | 1.7/0.07 | 0/0 |
| Moisture content (%) | 1.84 | 1.91 | 2.01 | 1.77 |
| Fuel load ($kg/m^3$) | 0.38 | 0.38 | 0.39 | 0.40 |

Conclusions

The study proves feasibility of co-milling of coal and pellets with a diameter of 8 mm and 12 mm in amounts of 5-10 wt %.

Drying effect for each setup is almost the same (1.7%-2.0% moisture, outlet air temperature 90° C.-74° C. after classifier).

Microscopic investigations evidence the successful grinding of pellets since filaments in μm-scale can be seen within coal dust.

When the SM04 grinder was opened after the trials no coating of the inner surfaces with melted plastic was found even though hot gas of up to 200° C.-225° C. was blown into the mill. During grinding temperatures within the mill became temporarily at at least 125° C.

The ground fuel powder is well suitable for firing industrial furnaces.

The invention claimed is:

1. A process for firing an industrial furnace wherein coal or cokes together with a secondary fuel comprising cellulose and plastic in the form of pellets of a size larger than about 3 mm thickness and having a caloric value of about 16 GJ/ton or more is co-grinded to a powder in a mill, wherein about 95 wt % or more of the powder has a particle size smaller than 2 mm, wherein the d50 of the particle size distribution is between about 5 and about 100 μm, and wherein the powder is injected in the flame of the furnace.

2. The process according to claim 1, wherein the co-grinding is performed in a roller mill or a ball mill.

3. The process according to claim 1, wherein the d50 of the powdered fuel is between 50 μm and about 10 μm.

4. The process according to claim 1, wherein the powdered fuel has a d90 of 0.5 mm or lower.

5. The process according to claim 1, wherein the pellets have a thickness of between about 3 mm and 20 mm.

6. The process according to claim 1, wherein the pellets consist of an amount of cellulose and plastic of about 50 wt % or more, relative to dry pellets.

7. The process according to claim 1, wherein the pellets consist of an amount of plastic of about 20 wt % or more.

8. The process according to claim 1, wherein the pellets have a caloric value of about 18 GJ/ton or more.

9. The process according to claim 1, wherein the strength of the pellets is between about 5 Kgf and about 70 Kgf.

10. The process according to claim 1, wherein an amount of pellets is used together with the coals is about 5 wt % or more, relative to the coal.

11. The process according to claim 1, wherein the mill is operated with a flow gas, wherein the flow gas is at a temperature of about 164° C. or higher upon entrance of the mill.

12. The process according to claim 1, wherein the industrial furnace is a furnace of a thermal power station for electricity generation.

13. The process according to claim 1, wherein the pellets consist of an amount of plastic of about 40 wt % or more, relative to dry pellets.

14. A process for firing an industrial furnace wherein coal or cokes together with a secondary fuel comprising cellulose and plastic in the form of pellets of a size larger than about 3 mm thickness and having a caloric value of about 16 GJ/ton or more is co-grinded to a powder in a mill, wherein about 95 wt % or more of the powder has a particle size smaller than 2 mm, wherein the d50 of the particle size distribution is between about 5 and about 100 µm, wherein the powder is injected in the flame of the furnace,
    wherein the mill is operated with a flow gas, wherein the flow gas is at a temperature of about 164° C. or higher upon entrance of the mill, and
    wherein the industrial furnace is a furnace of a thermal power station for electricity generation.

15. The process according to claim 14, wherein the d50 of the powdered fuel is between 50 µm and about 10 µm and wherein the powdered fuel has a d90 of 0.5 mm or lower.

16. The process according to claim 14, wherein the pellets have a thickness of between about 3 mm and 20 mm and wherein the pellets consist of an amount of cellulose and plastic of about 50 wt % or more, relative to dry pellets.

17. The process according to claim 14, wherein the mill is operated with a flow gas, wherein the flow gas is at a temperature of about 200° C. or higher upon entrance of the mill.

18. The process according to claim 14, wherein the co-grinding is performed in a roller mill or ball mill.

19. A process for firing an industrial furnace wherein coal or cokes together with a secondary fuel comprising cellulose and plastic in the form of pellets of a size larger than about 3 mm thickness and having a caloric value of about 16 GJ/ton or more is co-grinded to a powder in a mill, wherein about 95 wt % or more of the powder has a particle size smaller than 2 mm, wherein the d50 of the particle size distribution is between about 5 and about 100 µm, wherein the powder is injected in the flame of the furnace,
    wherein the grinder is operated with a flow gas, wherein the flow gas is at a temperature of about 164° C. or higher upon entrance of the mill,
    wherein the industrial furnace is a furnace of a thermal power station for electricity generation, and
    wherein the co-grinding is performed in a roller mill or ball mill,
    wherein the d50 of the powdered fuel is between 50 µm and about 10 µm and wherein the d90 of the powdered fuel is 0.5 mm or lower, and
    wherein the pellets have a thickness of between about 3 mm and 20 mm and wherein the pellets consist of an amount of cellulose and plastic of about 50 wt % or more, relative to dry pellets.

20. The process according to claim 19, wherein the mill is operated with a flow gas, wherein the flow gas is at a temperature of about 200° C. or higher upon entrance of the mill.

* * * * *